(12) United States Patent
Bergström et al.

(10) Patent No.: US 7,876,771 B2
(45) Date of Patent: Jan. 25, 2011

(54) MBMS ACKNOWLEDGEMENTS ON RACH

(75) Inventors: Joakim Bergström, Stockholm (SE); Ingela Ericsson, Bromma (SE); Peter Edlund, Tumba (SE); Dirk Gerstenberger, Kista (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 759 days.

(21) Appl. No.: 10/595,288

(22) PCT Filed: Oct. 6, 2004

(86) PCT No.: PCT/SE2004/001430

§ 371 (c)(1),
(2), (4) Date: Dec. 12, 2006

(87) PCT Pub. No.: WO2005/034397

PCT Pub. Date: Apr. 14, 2005

(65) Prior Publication Data

US 2007/0071025 A1 Mar. 29, 2007

(30) Foreign Application Priority Data

Oct. 6, 2003 (SE) .................................... 0302654

(51) Int. Cl.
*H04L 12/40* (2006.01)
(52) U.S. Cl. ...................... 370/448; 370/431; 370/445; 370/447
(58) Field of Classification Search ................. 370/431, 370/432, 445, 447, 448; 455/130, 150.1, 455/154.1, 158.1, 158.2, 158.3
See application file for complete search history.

(56) References Cited

U.S. PATENT DOCUMENTS

| 5,297,144 | A | | 3/1994 | Gilbert et al. |
| 5,621,732 | A | * | 4/1997 | Osawa ........................ 370/346 |
| 6,574,212 | B1 | * | 6/2003 | Halton et al. ................ 370/348 |
| 6,674,765 | B1 | * | 1/2004 | Chuah et al. ................. 370/458 |
| 2002/0075824 | A1 | * | 6/2002 | Willekes et al. ............. 370/329 |
| 2004/0032877 | A1 | * | 2/2004 | Chuah et al. ................. 370/444 |
| 2004/0229624 | A1 | | 11/2004 | Cai et al. |

FOREIGN PATENT DOCUMENTS

| EP | 0994603 A2 | 4/2000 |
| WO | WO 0013426 A2 | 3/2000 |
| WO | WO 2004043099 A2 | 5/2004 |
| WO | WO 2004057898 A1 | 7/2004 |

OTHER PUBLICATIONS

Swedish Patent Office, International Search Report for PCT/SE2004/001430, dated Jan. 27, 2005.

* cited by examiner

*Primary Examiner*—William Trost, IV
*Assistant Examiner*—Charles C Jiang
(74) *Attorney, Agent, or Firm*—Roger S. Burleigh

(57) ABSTRACT

The present invention relates to multicast communication systems and in particular to the implementation of a random access uplink channel, which can be used, e.g., for transmission of acknowledgement messages for received data. In order to prevent frequent collisions on said channel, the transmission of acknowledgement messages is spread at least over time or, additionally, with regard to another distinguishing channel property, e.g. a RACH sub-channel or RACH-signature.

5 Claims, 4 Drawing Sheets

MBMS ACKNOWLEDGEMENTS ON RACH

FIELD OF THE INVENTION

The present invention relates to methods and arrangements in a mobile 3$^{rd}$ generation communication system and user equipments intended for usage in such systems. It relates in particular to an efficient uplink channel handling for transmitting of control or feedback information related to the Multimedia Broadcast Multicast Service (MBMS).

FIELD OF THE INVENTION

MBMS is a service for transmitting data from a single source entity to multiple recipients in the downlink. There are two modes of operation defined, the broadcast and the multicast mode, serving a specific group of users that have in advance subscribed to or applied for a service on certain predetermined conditions. This is defined, inter alia, in 3GPP TS 25.346 "Introduction of Multimedia Broadcast/Multicast Service (MBMS) in the Radio Access Network (RAN); Stage 2" issued by the 3$^{rd}$ Generation Partnership Project (3GPP). The • service is considered to be a "best-effort" service, e.g., with no requirements for retransmissions in case on lost data. Therefore, originally no uplink has been considered, e.g., for transmission of feedback information from the user equipments or receipt acknowledgements of transmitted MBMS-data. An uplink communication is only provided for by a retransmission request on a higher layer that can be requested by the user, e.g. when an MBMS-message has not been correctly received. However, there might occur circumstances in using MBMS where it would be highly appreciated to receive feedback information of user equipments using an MBMS-service, e.g. for charging purposes or in order to exclude fraudulent users from applying the service. One conceivable approach for sending uplink feedback information is to use the random access channel (RACH), which constitutes a common uplink channel that is supported by all user equipments. The principles of the Random Access Channel are defined, e.g., in 3GPP 25.922, Annex H. The random access channel bases channel access on a slotted ALOHA scheme with random selection of available channels. FIGS. 1a and 1b illustrate two examples of suitable RACH/PRACH configuration possibilities for one cell. The upper part of the figures illustrate the one-to-one mapping between random access channel (RACH) and physical random access channel (PRACH). Each RACH is specified via an individual Transport Format Set whereby the associated PRACH employs a Transport Format Combination Set with each TFC in the set corresponding to one specific TF of the RACH. The channel can be sub-divided into up to 12 available sub-channels, whereof each sub-channel can be further divided into a maximum number of 16 sub-channel portions by help of a preamble signature pattern. This allows for a grouping, or partition, of the sub-channel space, which then can be assigned to user equipments according to a priority indication of the transmission for a particular service or according to the priority of the user equipment itself. For each PRACH a set of up to eight partitions can be defined for the establishment of Access Service Classes (ASC). An ASC consists thus of a PRACH partition and a persistence value. When a user equipment uses the RACH, it randomly picks a signature and sub-channel among the partitions, which it is allowed to use, and uses this as basis for the transmission of a RACH-message. If there is a collision, i.e. several user equipments picking the same preamble and sub-channel at a time, the user equipment will wait for a random time and then try again. This random time scheme works in normal cases when a large number of user equipments do not use the channel at the same time or if they are not synchronised in the beginning of the RACH usage.

SUMMARY OF THE INVENTION

Hitherto no specifically dedicated uplink channel has been defined for MBMS transmissions. Instead, the normal random access channel (RACH) shall be used for transmitting feedback information, e.g. acknowledgement of received MBMS data, to the unit that delivers MBMS-data. However, as the random access channel is not designed to handle large numbers of almost simultaneously starting channel accesses of user equipments that intend to send feedback messages, the transmissions would collide so that no reasonable usage of the random access channel is possible. In addition to this, transmissions relating to MBMS feedback will also collide with other non-MBMS transmissions.

It is therefore the object of the present invention to achieve a method and arrangement that avoids collisions on the random access channel due to transmissions of MBMS feedback information on the random access channel.

The solution according to the present invention suggests a division of an MBMS-session into a first period for transmission of MBMS-data to user equipments and a subsequent second period for receiving feedback information, e.g. MBMS-data acknowledgements, from said user equipments. The present invention further suggests a spreading of the uplink transmission of said feedback information from said user equipments in order to minimise collisions of such transmissions on the uplink channel. The spreading is performed at least over time or, additionally, with regard to another distinguishing channel property, e.g. a RACH sub-channel or RACH-signature.

It is an advantage of the present invention that collisions on RACH can be avoided when sending volume based MBMS-acknowledgement messages by preventing all user equipments to start transmissions at the same time.

It is another advantage of the present invention that MBMS-acknowledgements do not interfere with other normal non-MBMS related uplink activities.

It is yet another advantage of the present invention that the network has control of the amount of collisions that should be allowed for MBMS-acknowledgements.

It is thus another advantage of the present invention that the service provider can retrieve additional feedback information that can be used, e.g., for charging purposes or to prevent a fraudulent use of the service. Such feedback information can indicate, e.g., whether or not data has been successfully received but also the quality of the received data.

Other objects, advantages and novel features of the invention will become apparent from the following detailed description of the invention when considered in conjunction with the accompanying drawings and claims.

DETAILED DESCRIPTION

When considering a very large number of users of an MBMS-service within a same limited geographical area, e.g. thousands of users at a sports arena, the introduction of a RACH-based MBMS-uplink implies the problem that the uplink radio interface between said user equipments and the network system is not capable to support the transmission of uplink feedback information from each of said user equipments. However, said feedback will be necessary, inter alia, to allow a correct billing of the user equipments or to prevent a fraudulent use of the service. The reason for said problems is that the current uplink channel structure is not designed for a large number of users starting almost simultaneously to send feedback messages. Thus, when using the normal RACH uplink channel, which is based on a slotted ALOHA-scheme, as the MBMS-uplink channel all receptions will collide with their transmissions making it thus impossible for any user to use the uplink channel. This is because all user equipments receiving MBMS-data get the last part of a MBMS-data portion virtually at the same time and also start, as a consequence, sending their acknowledgement messages for said received MBMS-data virtually at the same time. In addition to this, the user equipments using the MBMS-service and sending the MBMS-acknowledgements will interfere with other user equipments, which do not use the MBMS-service and trying to access the network. In scenarios with a large number of user equipments this will lead to a deterioration of the system performance and will prevent the system from utilising an efficient charging that bases, e.g., on volume of content of MBMS-data messages that have been sent to a user equipment.

Figure 2:
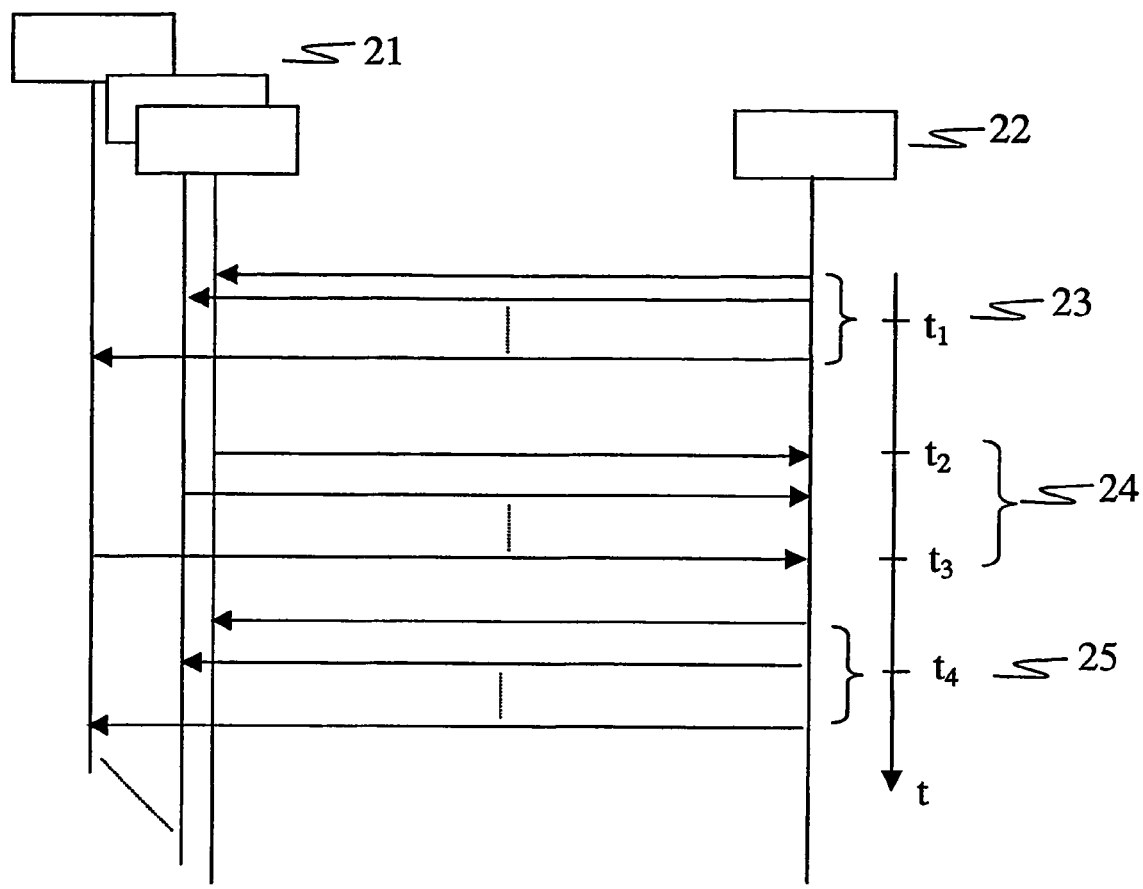
FIG. 2 shows an example of an MBMS-session with uplink transmission of acknowledgement messages that are spread over at least the parameter time.

Each MBMS-session is sub-divided into distinct periods for the transfer of MBMS-data messages from a radio base station 21 to the group of user equipments $UE_1 \ldots UE_n$ 22, which participate in said MBMS-session and are served by said radio base station, and for the transfer of feedback messages from said user equipments back to said radio base station. This is illustrated in FIG. 2. During a "MBMS data transfer period" at time $t_1$ the radio base station 21 sends on a physical channel resource one or several MBMS data portions simultaneously to the user equipments $UE_1 \ldots UE_n$ 22. However, in case of a very large number of participating user equipments, it might be a conceivable alternative to apply more than one physical channel resource. Then, during a subsequent "MBMS data feedback period" each of said user equipments $UE_1 \ldots UE_n$ 22, which was supposed to receive the MBMS data portion, sends an acknowledgement message for the MBMS-data, which has been successfully received during the previous period. The spreading of the transmissions of acknowledgement messages during the data feedback period is illustrated by the time period $(t_3-t_2)$ during which said acknowledgements are transmitted. After the data feedback period the radio base station 21 sends at time $t_4$ a new data portion 25 to the user equipments, either immediately or at the time when there is new data to transmit. In case that the user equipments need a new ciphering key for decoding following MBMS-data messages there must be a certain guard time, e.g. $(t_2-t_1)$ or $(t_4-t_3)$, between the "MBMS data transfer period" and the "MBMS data feedback period". This, however, is not necessary in other cases.

The following will describe several alternative embodiments to realise a spreading of the transmission of acknowledgement messages according to the present invention. FIG. 2 shows a spreading over time for the various MBMS acknowledgement messages. As explained below, the spreading can also be achieved by means of applying other distinguishing channel properties. In general, the extent of spreading depends mainly on the number of user equipments using the random access channel. The following alternatives still imply the possibility that several user equipments start sending acknowledgement messages at the same time as long as the number of user equipments is not too big.

Figure 3:
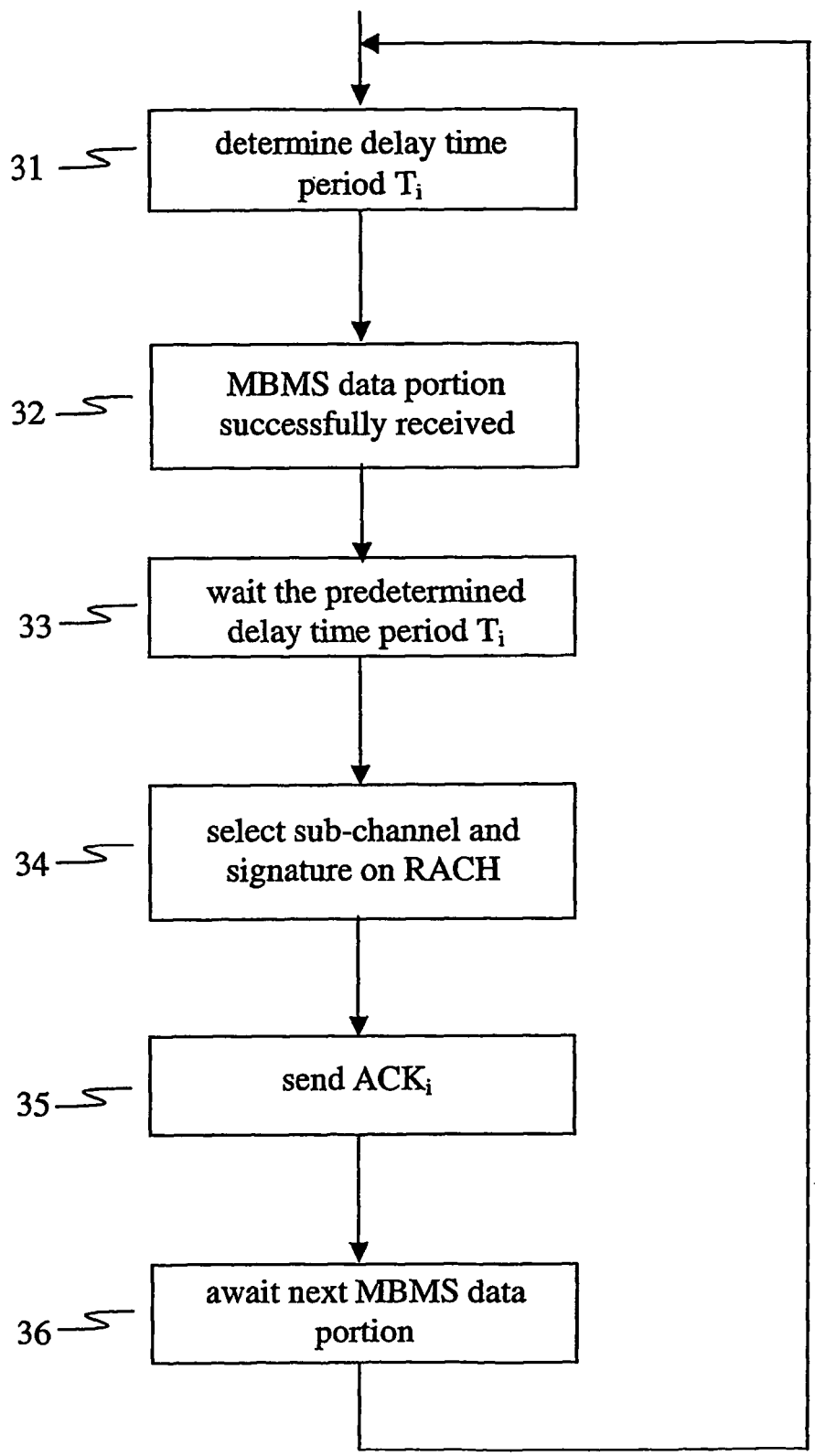
FIG. 3 illustrates a flowchart to achieve a spreading of the transmission of MBMS-acknowledgements at least over the parameter time as implemented in the user equipment.

FIG. 3 illustrates a flowchart describing an embodiment of the present invention as implemented in the user equipment. A user equipment participating in an MBMS-session has successfully received 32 a MBMS data portion. In order to avoid that this and the other user equipments, which all participate in the same MBMS-session, transmit the RACH-message including the MBMS-acknowledgement message at the same time, the user equipment has determined a delay time period $T_i$ and does not start sending the acknowledgement message $ACK_i$ for said received MBMS data portion before the lapse of a certain predetermined waiting time $T_i$ 33, which is uniquely assigned for this specific user equipment.

Said waiting time $T_i$ must not exceed a certain upper threshold value, which defines a maximum permitted duration of the "MBMS data feedback period". The threshold value has been illustrated in FIG. 2 by the time period $(t_3-t_2)$ during which said acknowledgements are transmitted. This time period is, in principle, a function of the number of available sub-channels and signatures on the random access channel and the number of user equipments that participate in the MBMS-session. The time spreading period, which is illustrated by the time period $(t_3-t_2)$, must be selected the larger the more user equipments participate in the MBMS-session. On the other hand, the time spreading period can be smaller for an increased number of sub-channels and/or signatures that are available on the random access channel.

Each user equipment $UE_i$ applies thus within a given time interval $T_i$ a fixed but unique time delay before starting the transmission of an acknowledgement message. According to a first embodiment of the present invention, as illustrated in FIG. 3, the user equipment itself calculates 31 the delay time period based on the UE-identity, e.g. the IMEI or IMSI, or another property that is unique to the user equipment. According to an alternative embodiment the network assigns said delay time period $T_i$ individually to each of the user subscribing equipments $UE_i$. This is described in FIG. 4. The steps of determining and assigning can be done at certain instances of time during an MBMS-session, e.g. depending on the time when the user equipment has sent its latest MBMS-acknowledgement, or at the time when a user equipment participates in the MBMS-session. According to yet another embodiment of the present invention the time spreading for the transmission of the various acknowledgement messages is achieved by help of determining a random waiting time for transmission of said messages, i.e. without further concerns on a parameter that is unique for each user equipment. This embodiment provides the advantage that it is very simple to implement; however, this also implies an increased risk that several user equipments apply the same or an overlapping time delay.

The flowchart of FIG. 3 illustrates the acknowledgement procedure for one of the user equipments participating in an MBMS-session. The user equipment $UE_i$, which has received a certain portion of MBMS-data, waits for a predetermined $T_i$, which is calculated and assigned to the user equipment as described above. Optionally, the user equipment selects 34 a sub-channel on the random access channel and a signature for sending 35 the acknowledgement message $ACK_j$. After sending of the acknowledgement message, the user equipment waits 36 for the next portion of MBMS-data. As each of the user equipments $UE_i$ has an individual delay time this will prevent, or at least minimise, collisions of acknowledgement messages on the RACH-channel. At a time $T_{i+1}$ the signature and sub-channel positions can be fully re-used again. This will prevent collisions and facilitates for the UTRAN to know which user equipment is transmitting at a certain signature/sub-channel.

Figure 4:
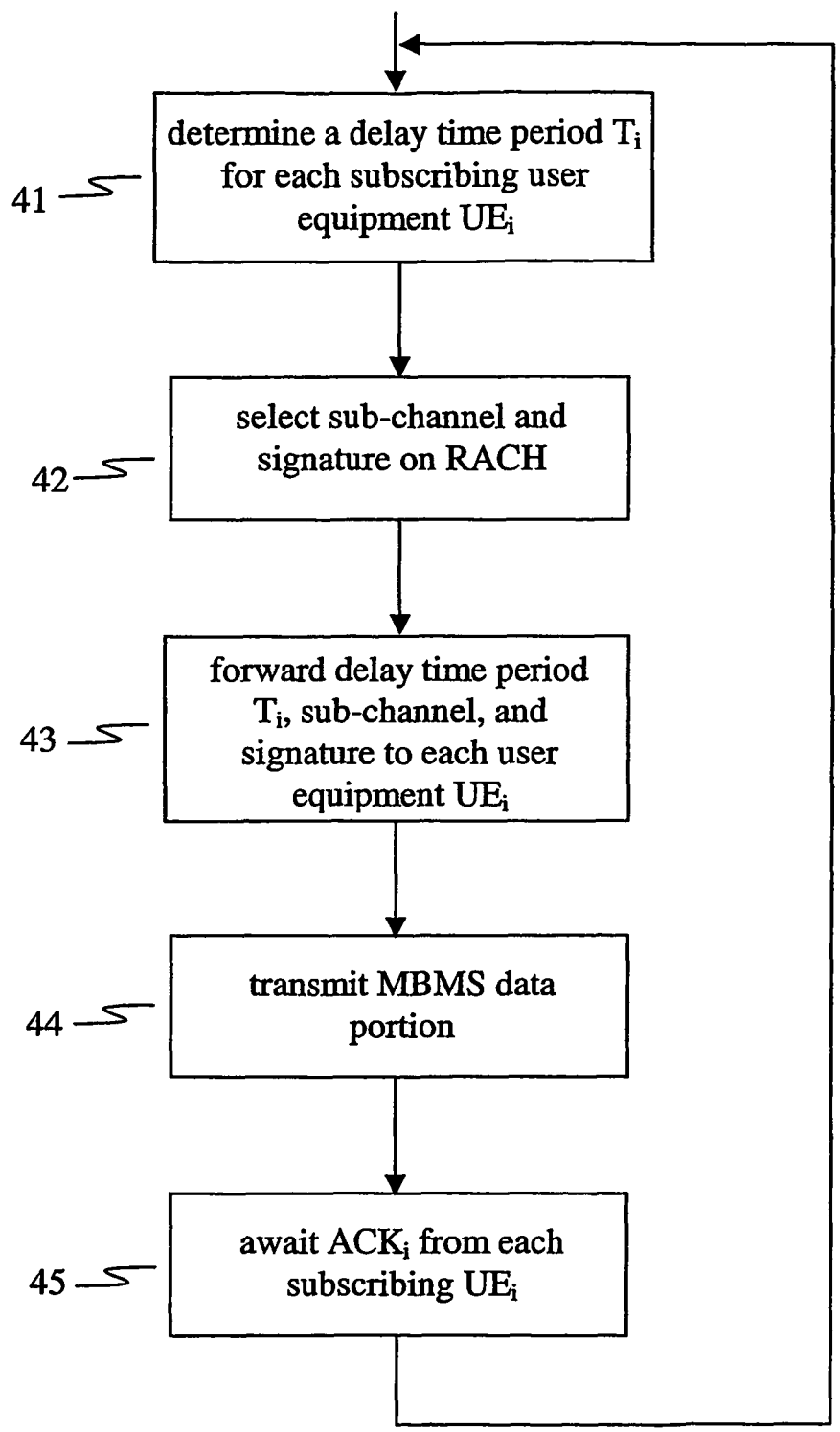
FIG. 4 illustrates a flowchart to achieve a spreading of the transmission of MBMS-acknowledgements at least over the parameter time as implemented in a network unit.

FIG. 4 illustrates a flowchart describing an embodiment of the present invention as implemented in a unit of the telecommunication network providing the MBMS-service. Instead of the user equipment. calculating the delay time period it is another conceivable embodiment of the present invention that a unit in the network calculates 41 the delay time period $T_i$ for each of the subscribing user equipments $UE_i$ and, if applied, selects 42 a sub-channel and signature on the random access channel. The network unit provides 43 the value of the determined delay time period Ti and, if selected, sub-channel and signature to the respective user equipment $UE_i$. This can be done only one time for a MBMS-session or more frequently during the session, e.g. in conjunction with the delivery of a new ciphering key to the user equipment for decoding of MBMS-messages. Then, the network transmits 44 MBMS-data portions to the subscribing user equipments and awaits 45 a feedback information including at least an acknowledgement message for successfully received MBMS-data.

Figure 1A:
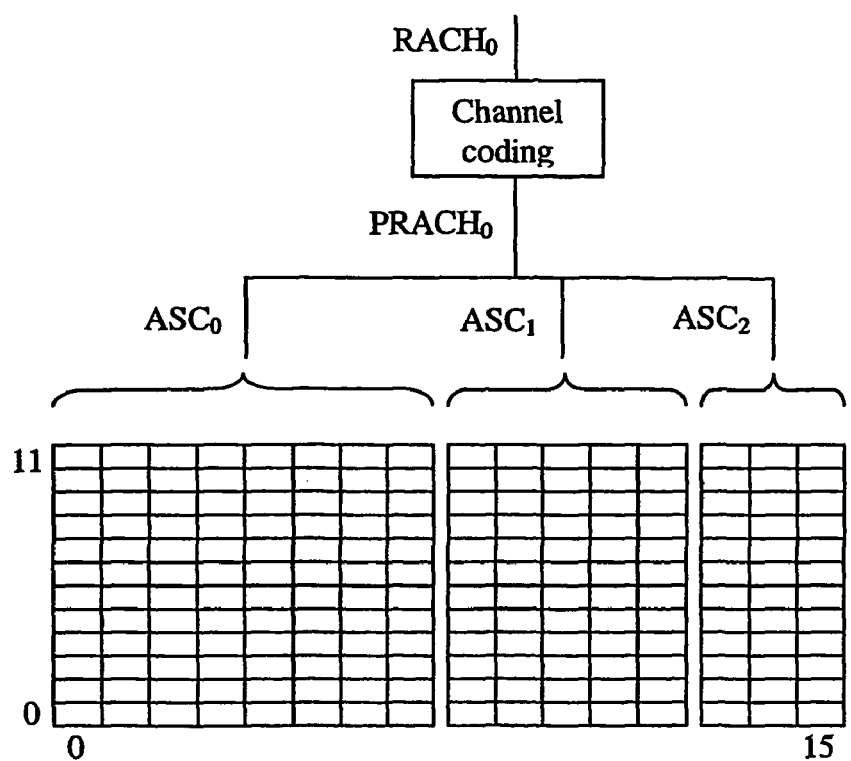
FIGS. 1a and 1b show two examples from 3GPP TR 25.922 v3.7.0 of FDD RACH/PRACH configurations in a cell.
Figure 1B:
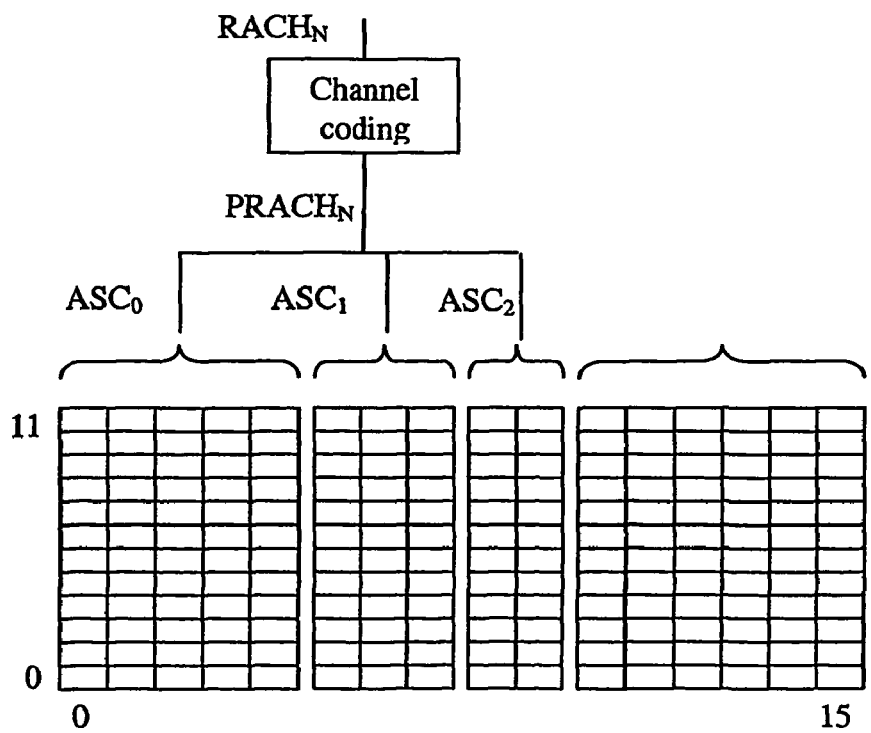

When considering a large number of user equipments, a time spreading of the start of transmission of acknowledgement messages is probably not a sufficient measure to prevent collisions of transmitted acknowledgement messages. Therefore, in a further elaboration of the invention the user equipments start sending acknowledgement messages at different times and on different sub-channels and using different signatures. As illustrated in FIG. 1 the random access channel can be sub-divided into a number of sub-channels and signatures that can be assigned to user equipments. In terms of the flowchart of FIG. 3 the user equipment $UE_i$ starts after a delay time $T_i$ and allocates 34 one specific signature, e.g. of a range from 0 to 15, and a specific sub-channel, e.g. of a range from 0 to 11, for transmission of the acknowledgement message. Thus, the acknowledgement message of a user equipment $UE_j$, which starts at the same time $T_j=T_i$ as the first user equipment $UE_i$ but using at least a different signature or a different sub-channel will not collide with the acknowledgement message of the user equipment $UE_i$. Also this alternative implies the possibility that several user equipments start sending acknowledgement messages at the same time as long as the number of user equipments is not too big.

The invention claimed is:

1. A method for avoiding collisions on a random access channel of a telecommunication system providing Multimedia Broadcast/Multicast Services (MBMS) to a plurality of subscribing user equipments, said method comprising the steps of:
   dividing an MBMS session into a first period for transmission of MBMS data to user equipments and a subsequent second period for receiving feedback information, by determining a delay time period for each subscribing user equipment after the lapse of which said user equipment starts transmission of feedback information on the random access channel for acknowledgement of successfully received MBMS data portions; and
   selecting a preamble signature for use on a sub-channel of a random access channel for the subscribing user equipments; then,
   forwarding said respective delay time periods and preamble signature to the user equipments; then
   transmitting one or more MBMS data portions on a downlink channel to the group of subscribing user equipments; and
   receiving feedback information from the plurality of user equipments.

2. The method according to claim 1, wherein said delay time period starts counting at a user equipment from the successful reception of said one or more MBMS-data portions.

3. The method according to claim 1, wherein said delay time period is calculated from a unique identifier of the user equipment.

4. The method according to claim 1, wherein said delay time period constitutes a randomly determined value within a given time period.

5. A method in a user equipment of a telecommunication system subscribing to a Multimedia Broadcast/Multicast Service (MBMS), said method comprising the steps of:
   determining a delay time period based on dividing an MBMS session into a first period for transmission of MBMS data to the user equipment and a subsequent second period for transmitting feedback information by the user equipment;
   using a preamble signature on a sub-channel of a random access channel for transmission of said feedback information by the user equipment; and
   transmitting by the user equipment, after the lapse of said delay time period, feedback information on the random access channel using the preamble signature for acknowledgement of successfully received MBMS-data portions.

* * * * *